US012424718B2

(12) United States Patent
Kim et al.

(10) Patent No.: US 12,424,718 B2
(45) Date of Patent: Sep. 23, 2025

(54) ATTENUATOR INCLUDING NONUNIFORM RESISTORS AND APPARATUS INCLUDING THE SAME

(71) Applicant: SAMSUNG ELECTRONICS CO., LTD., Suwon-si (KR)

(72) Inventors: Taewan Kim, Yongin-si (KR); Byung-wook Min, Seoul (KR); Hyungyu Kim, Suwon-si (KR); Bosung Suh, Seoul (KR); Kiryong Song, Hwaseong-si (KR); Jounghyun Yim, Hwaseong-si (KR); Michael Choi, Seoul (KR); Youngjoo Lee, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 389 days.

(21) Appl. No.: 17/870,119

(22) Filed: Jul. 21, 2022

(65) Prior Publication Data

US 2023/0026959 A1 Jan. 26, 2023

(30) Foreign Application Priority Data

Jul. 22, 2021 (KR) ........................ 10-2021-0096708

(51) Int. Cl.
*H01P 1/22* (2006.01)
*H01Q 3/34* (2006.01)

(52) U.S. Cl.
CPC ................. *H01P 1/22* (2013.01); *H01Q 3/34* (2013.01)

(58) Field of Classification Search
CPC ............ H03H 7/25; H03H 7/185; H03H 7/20; H03H 7/24; H03H 7/253; H03H 7/255;
(Continued)

(56) References Cited

U.S. PATENT DOCUMENTS 3,859,609 A * 1/1975 Couvillon ................. H01P 1/22 327/310
4,837,530 A 6/1989 Kondoh
(Continued)

FOREIGN PATENT DOCUMENTS

JP 11-317605 A 11/1999
KR 10-0225472 B1 10/1999

OTHER PUBLICATIONS

Suh et al., "A 20-36-GHz Voltage-Controlled Analog Distributed Attenuator With a Wide Attenuation Range and Low Phase Imbalance", IEEE Transactions on Microwave Theory and Techniques, vol. 69, No. 5, May 2021, (9 total pages).
(Continued)

*Primary Examiner* — Andrea Lindgren Baltzell
*Assistant Examiner* — Abigail Amir Yaldo
(74) *Attorney, Agent, or Firm* — Sughrue Mion, PLLC

(57) ABSTRACT

An attenuator includes: a first transmission line connected between a first terminal and a first node; a second transmission line connected between the first node and a second terminal; a first resistor connected between the first terminal and a ground node; a second resistor connected between the second terminal and the ground node; and a third resistor connected between the first node and the ground node, wherein the first and second resistors each have a resistance that is higher than a resistance of the third resistor.

17 Claims, 23 Drawing Sheets

20a

(58) Field of Classification Search
CPC ...... H03H 7/256; H03H 11/24; H03H 11/245; H01P 1/22; H01P 1/227; H01Q 3/34
USPC ........................................................ 333/81
See application file for complete search history.

(56) References Cited

U.S. PATENT DOCUMENTS

| | | | |
|---|---|---|---|
| 5,502,421 | A | 3/1996 | Nakahara |
| 6,737,933 | B2 | 5/2004 | Nyberg |
| 6,888,419 | B2 | 5/2005 | Yufu et al. |
| 7,205,817 | B1 | 4/2007 | Huang et al. |
| 9,024,702 | B2 | 5/2015 | Shin et al. |
| 9,160,281 | B2 | 10/2015 | Igarashi et al. |
| 10,862,521 | B1 | 12/2020 | Raviprakash et al. |
| 2008/0032653 | A1 | 2/2008 | Inoue |

OTHER PUBLICATIONS

Communication dated Mar. 24, 2025 issued by the Korean Intellectual Property Office in Korean Patent Application No. 10-2021-0096708.

* cited by examiner

ATTENUATOR INCLUDING NONUNIFORM RESISTORS AND APPARATUS INCLUDING THE SAME

CROSS-REFERENCE TO RELATED APPLICATION

This application is based on and claims priority from Korean Patent Application No. 10-2021-0096708, filed on Jul. 22, 2021, in the Korean Intellectual Property Office, the disclosure of which is incorporated by reference herein in its entirety.

BACKGROUND

The example embodiments relate to an attenuator, and more particularly, to an attenuator including nonuniform resistors and an apparatus including the attenuator.

A wide frequency bandwidth may be used for wireless communication to achieve high throughput. For such wide-band communication, for example, a millimeter wave (mm-Wave) frequency band above about 24 GHz may be adopted. A signal in a high frequency band such as mmWave may be easily attenuated, and beamforming may be employed to ensure service coverage. Beamforming may be implemented by an antenna array including a plurality of antennas, and signals respectively applied to the plurality of antennas for beamforming may have different magnitudes and phases.

SUMMARY

The example embodiments provide an attenuator for desirably attenuating a high-frequency signal and an apparatus including the attenuator.

According to example embodiments, there is provided an attenuator including: a first transmission line connected between a first terminal and a first node; a second transmission line connected between the first node and a second terminal; a first resistor connected between the first terminal and a ground node; a second resistor connected between the second terminal and the ground node; and a third resistor connected between the first node and the ground node, wherein the first and second resistors each have a first resistance that is higher than a second resistance of the third resistor.

According to example embodiments, there is provided an apparatus including: a plurality of antennas respectively corresponding to a plurality of channels; a plurality of phase shifters respectively corresponding to the plurality of channels; and a plurality of attenuators respectively corresponding to the plurality of channels, wherein each of the plurality of attenuators includes: a first resistor connected between a first terminal and a ground node; a second resistor connected between a second terminal and the ground node; and at least one third resistor connected in parallel with the first and second resistors via a transmission line, and the first and second resistors each have a resistance that is higher than a resistance of the at least one third resistor.

According to example embodiments, there is provided an attenuator including: a first transmission line connected between a first terminal and a first node; a second transmission line connected between a second terminal and a second node; a third transmission line connected between the first node and the second node; a first resistor connected between the first terminal and a ground node; a second resistor connected between the second terminal and the ground node; a third resistor connected between the first node and the ground node; and a fourth resistor connected between the second node and the ground node, wherein the first and second resistors each have a resistance that is higher than a resistance that the third and fourth resistors each have.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
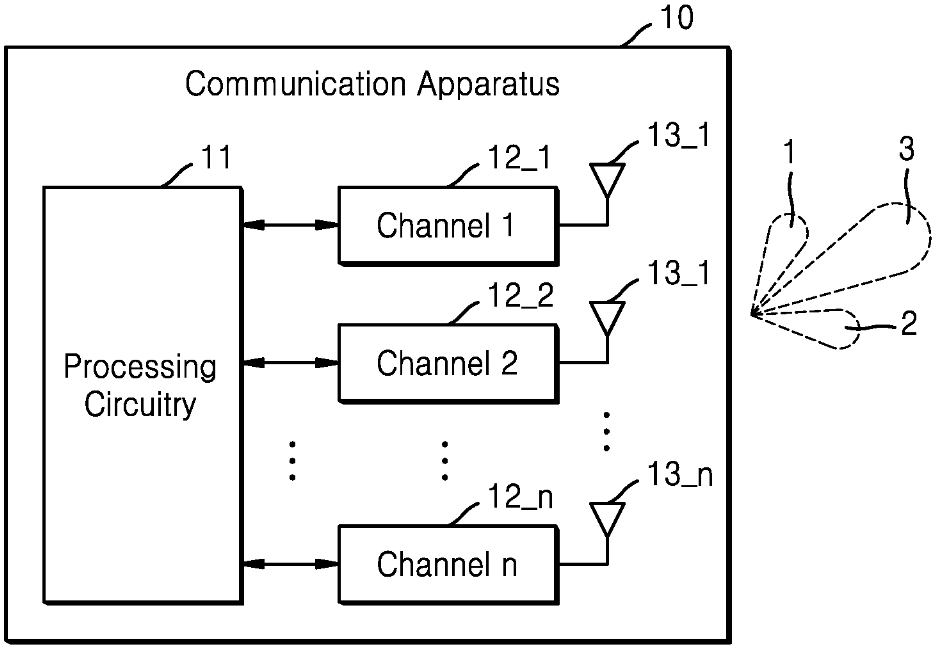
FIG. 1 is a block diagram of an apparatus according to an embodiment.

All of the embodiments described herein are example embodiments, and thus, the inventive concept is not limited thereto and may be realized in various other forms FIG. 1 is a block diagram of an apparatus according to an embodiment. In detail, the block diagram of FIG. 1 illustrate a communication apparatus 10 for performing wireless communication.

The communication apparatus 10 may refer to any apparatus that performs wireless communication. For example, the communication apparatus 10 may be included in a wireless communication system, and may exchange information with another communication apparatus via wireless communication in the wireless communication system As a non-limiting example, the wireless communication system may be a wireless communication system using a cellular network, such as a $5^{th}$ generation (5G) wireless system, a long-term evolution (LTE) system, an LTE-Advanced (LTE-A) system, a code division multiple access (CDMA) system, a global system for mobile communications (GSM) system, etc., a wireless local area network (WLAN) system, a wireless personal area network (WPAN) system, or any other wireless communication system.

In some embodiments, the communication apparatus 10 may be a user equipment (UE) or a base station (BS) in a wireless communication system based on a cellular network. A UE may be stationary or mobile, and may transmit or receive data and/or control information by wirelessly communicating with a BS. For example, a UE may be referred to as a terminal, a terminal equipment, a mobile station (MS), a mobile terminal (MT), a user terminal (UT), a subscriber station (SS), and a wireless device, a handheld device, and the like. A BS may refer to a fixed station that communicates with a UE and/or another BS, and may exchange data and control information by communicating with the UE and/or the other BS. For example, a BS may be referred to as a Node B, an evolved Node B (eNB), a next generation Node B (gNB), a sector, a site, a base transceiver system (BTS), an access point (AP), a relay node, a remote radio head (RRH), a radio unit (RU), a small cell, and the like. In some embodiments, the communication apparatus 10 may also be an AP or a station STA in a WLAN system.

The communication apparatus 10 may perform wireless communication based on beamforming, and a wireless communication system including the communication apparatus 10 may define requirements for the communication apparatus 10 to achieve beamforming. For example, the wireless communication system may adopt a mmWave frequency band to increase throughput, and employ beamforming to overcome a significant path loss at mmWave frequencies. For example, as shown in FIG. 1, the communication apparatus 10 may form a beam having a main lobe 3 and side lobes 1 and 2. In order to form a beam, the communication apparatus 10 may include a plurality of antennas and a plurality of channels respectively corresponding to the plurality of antennas. For example, as shown in FIG. 1, the communication apparatus 10 may include first to n-th antennas 13_1 to **13_*n* and first to n-th channels 12_1 to 12_*n*, and further include a processing circuitry 11 for communicating with the first to n-th channels 12_1 to 12_*n* (n is an integer greater than 1). The first to n-th antennas 13_1 to 13_*n*** may also be referred to as a phased array antenna.

Magnitudes and phases of signals respectively output via the first to n-th antennas 13_1 to **13_*n* may be controlled to form a beam. For example, the first to n-th channels 12_1 to 12_*n* may process signals received from the processing circuitry 11, and respectively provide the processed signals to the first to n-th antennas 13_1 to 13_*n*. The processing circuitry 11 may generate the signals to be processed by the first to n-th channels 12_1 to 12_*n*, and produce control signals for controlling processes by the first to n-th channels 12_1 to 12_*n*. Each of the first to n-th channels 12_1 to 12_*n* may adjust a magnitude and/or a phase of a signal provided by the processing circuitry 11 based on a control signal. In some embodiments, the first to n-th channels 12_1 to 12_*n* and the first to n-th antennas 13_1 to 13_*n* may be manufactured using a semiconductor fabrication process and be encapsulated into a package, and they may be collectively referred to as an antenna module or device. An example of the first to n-th channels 12_1 to 12_*n* will be described later with reference to FIG. 12**.

Each of the first to n-th channels 12_1 to **12_*n* may include a component, i.e., an amplitude control block for accurately adjusting an amplitude of a signal, to control the side lobes 1 and 2 and a bandwidth of a corresponding one of the first to n-th antennas 13_1 to 13_*n***. For example, an amplitude control block may include a variable gain amplifier (VGA) and/or a variable attenuator. The amplitude control block may be required to have a low insertion phase variation compared to an amplitude variation to avoid tracking errors and complex phase/amplitude corrections. The variable gain amplifier may provide a sufficient gain with low phase imbalance, but may have high power consumption, a narrow bandwidth, low linearity, and a limited gain tuning range. Accordingly, a variable attenuator providing a large attenuation range while having a wide band and bi-directionality may be used. Herein, a variable attenuator may be simply referred to as an attenuator.

The processing circuitry 11 may respectively provide signals to the first to n-th channels 12_1 to **12_*n*, or process signals received from the first to n-th channels 12_1 to 12_*n*. In some embodiments, the processing circuitry 11 may include an analog-to-digital converter (ADC) and/or a digital-to-analog converter (DAC), and process digital signals. For example, the processing circuitry 11** may include at least one of a programmable component such as a central processing unit (CPU), a digital signal processor (DSP), a graphics processing unit (GPU), or the like, a reconfigurable component such as a field programmable logic array (FGPA) or the like, and a component having a fixed function, such as an intellectual property (IP) core or the like.

Hereinafter, as described below with reference to the drawings, an attenuator according to embodiments may exhibit low insertion loss while having a wide attenuation range. Furthermore, the attenuator may provide constant performance despite process voltage temperature (PVT) variations, and may be easily designed. In addition, the attenuator may have a low phase imbalance due to phase compensation. As a result, beamforming may be accurately and easily accomplished due to an attenuator having desirable characteristics, and the efficiency of wireless communication may be increased.

Figure 2A:
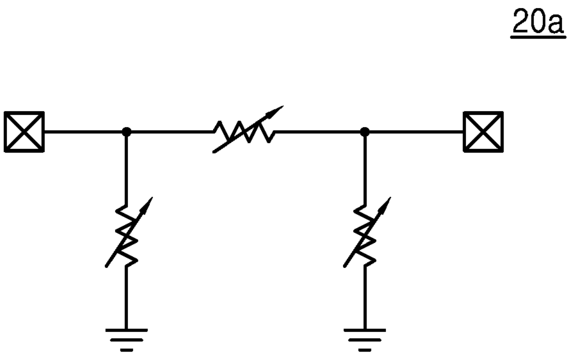
FIGS. 2A to 2C are circuit diagrams illustrating examples of attenuators.
Figure 2B:
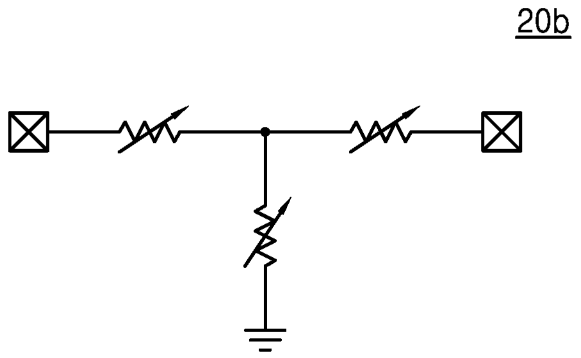
Figure 2C:
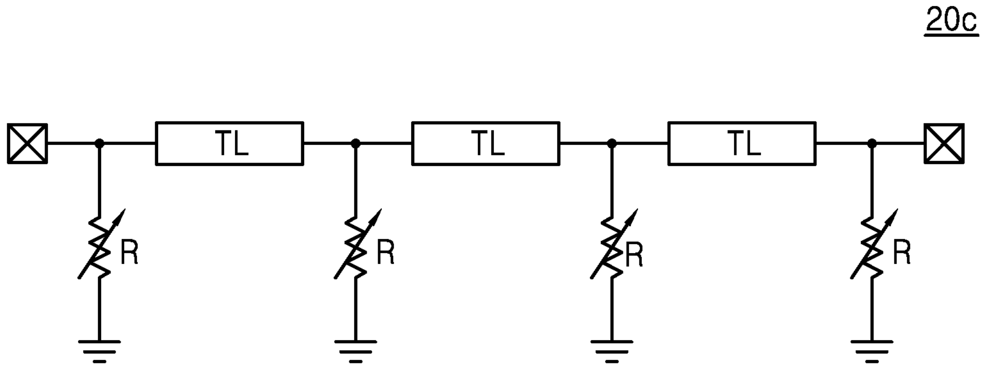

FIGS. 2A to 2C are circuit diagrams illustrating examples of attenuators according to comparative examples. In detail, the circuit diagrams of FIGS. 2A to 2C show analog attenuators, i.e., a π-type analog attenuator **20*a*, a T-type analog attenuator 20*b*, and a distributed attenuator 20*c***, as a type of attenuator.

The attenuator may include a digital attenuator and an analog attenuator. The digital attenuator may include switches. A T-type digital attenuator, a it-type digital attenuator, a bridged T-type digital attenuator, etc. may provide a wide attenuation range and low phase imbalance while suffering from a high insertion loss due to switch transistors connected in series. Furthermore, a distributed step attenuator may provide a low insertion loss due to the omission of serially connected switch transistors, but have a limitation on providing a wide attenuation range.

The analog attenuator may not be affected by serially connected switch transistors, and require only a small number of control signals. Referring to FIGS. 2A and 2B, the π-type analog attenuator **20*a* and the T-type analog attenuator 20*b*, mainly used in low frequency applications, may suffer from a high insertion loss due to serially connected resistors while providing a wide attenuation range. Referring to FIG. 2C, the distributed attenuator 20*c* used in high frequency applications may absorb parasitic capacitance in a transmission line TL and provide a low insertion loss due to the omission of resistors connected in series. However, the distributed attenuator 20*c*** may have a narrow attenuation range relative to an area due to a width of shunt resistors increasing for a wide attenuation range. An attenuator that provides a wide attenuation range, low insertion loss, low phase imbalance, and a compact chip size will be described below with reference to the drawings.

Figure 3A:
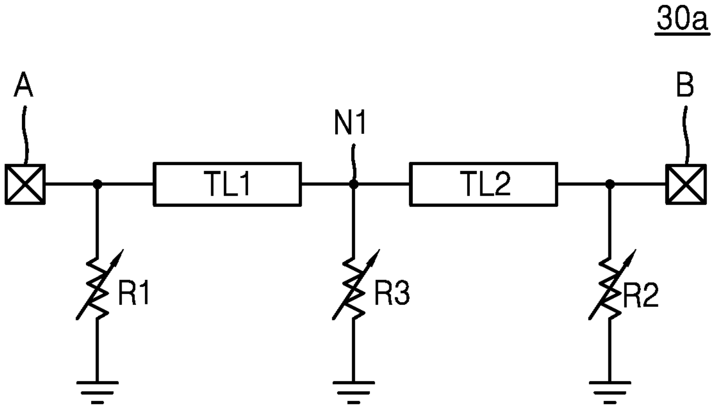
FIGS. 3A and 3B are circuit diagrams illustrating attenuators according to embodiments.
Figure 3B:
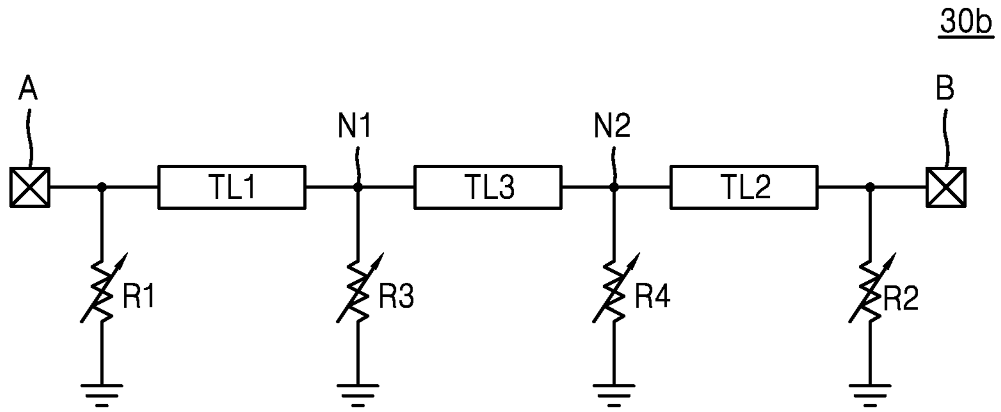
Figure 4:
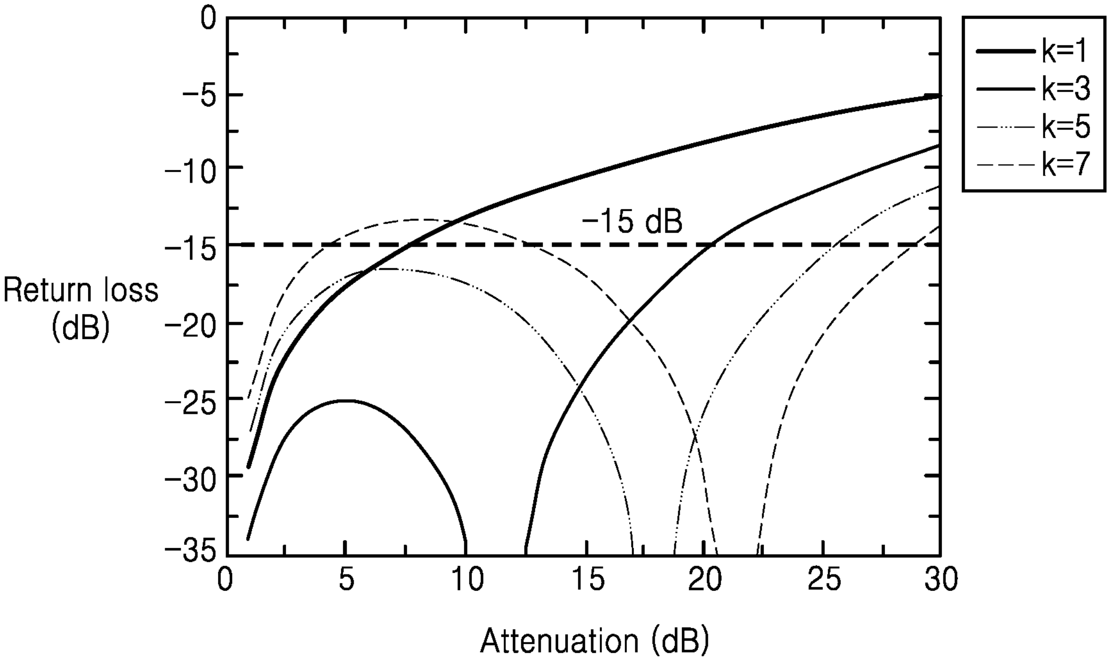
FIG. 4 is a graph illustrating characteristics of the attenuator of FIG. 3A, according to an embodiment.

FIGS. 3A and 3B are circuit diagrams illustrating attenuators according to embodiments, and FIG. 4 is a graph illustrating characteristics of an attenuator **30*a* of FIG. 3**A, according to an embodiment.

Referring to FIGS. 3A and 3B, the attenuators **30*a* and 30*b* may have a symmetrical structure, and thus, have bidirectionality. For example, the attenuators 30*a* and 30*b*** may attenuate a signal received via a first terminal A, and output the received signal via a second terminal B in a transmission mode, and attenuate a signal received via the second terminal B and output the received signal via the first terminal A in a reception mode.

Referring to FIG. 3A, the attenuator 30*a* may include first to third resistors R1 to R3 connected in parallel with one another via first and second transmission lines TL1 and TL2. The first resistor R1 may be connected between the first terminal A and a ground node, the second resistor R2 may be connected between the second terminal B and a ground node, and the third resistor R3 may be connected between a first node N1 and a ground node. Furthermore, the first transmission line TL1 may be connected between the first terminal A and the first node N1, and the second transmission line TL2 may be connected between the second terminal B and the first node N1. As shown in FIG. 3A, each of the first to third resistor R1 to R3 may be a variable resistor of which a resistance varies according to a control signal for determining an amount of attenuation, and may, for example, be a varistor having a varying resistance depending on a control voltage applied thereto.

In some embodiments, each of the first and second transmission lines TL1 and TL2 may have an impedance of 50Ω and a length of λ/4 (or 90 degrees) of a center frequency. When low attenuation occurs, i.e., the first to third resistors R1 to R3 all have high resistances, a sufficient return loss may be achieved due to the 50Ω impedance. In addition, due to the λ/4 (or 90 degrees) length, phase imbalance may be zero regardless of attenuation at the center frequency (e.g., 28 GHz).

In some embodiments, the first and second resistors R1 and R2 respectively connected to the first and second terminals A and B may each have a resistance that is higher than a resistance of the third resistor R3 connected to the first node N1. For example, the resistance of each of the first and second resistors R1 and R2 may be k times the resistance of the third resistor R3 (k>1). Accordingly, the attenuator 30*a* may include nonuniform resistors, and have a sufficient return loss and a wide attenuation range.

Referring to FIG. 4, the graph shows attenuation and a return loss with respect to a change in a value of k. As shown in FIG. 4, when k is 1, a return loss may be less than about 15 decibels (dB) at attenuation greater than 8 dB. As the value of k increases, a sufficient return loss may be achieved even at high attenuation level, while a return loss may be limited at low attenuation. For example, when k is 7, the return loss may be less than 15 dB at attenuation of 4.5 dB to 13 dB. Accordingly, the value of k may be chosen to be 5 which provides a return loss greater than 15 dB up to a wide attenuation of 25 dB, and the resistance of the first and second resistors R1 and R2 in FIG. 3A may be 5 times that of the third resistor R3. Hereinafter, it is assumed that k is 5, but it should be noted that embodiments are not limited thereto.

Referring to FIG. 3B, the attenuator 30*b* may include first to fourth resistors R1 to R4 connected in parallel with one another via first to third transmission lines TL1 to TL3. The first resistor R1 may be connected between a first terminal A and a ground node, and the second resistor R2 may be connected between a second terminal B and a ground node. Furthermore, the third resistor R3 may be connected between a first node N1 and a ground node, and the fourth resistor R4 may be connected between a second node N2 and a ground node. The first transmission line TL1 may be connected between the first terminal A and the first node N1, the second transmission line TL2 may be connected between the second terminal B and the second node N2, and the third transmission line TL3 may be connected between the first and second nodes N1 and N2. As shown in FIG. 3B, each of the first to fourth resistors R1 to R4 may be a variable resistor of which a resistance varies according to a control signal for determining an amount of attenuation, and may, for example, be a varistor having a varying resistance depending on a control voltage applied thereto.

In some embodiments, each of the first to third transmission lines TL1 to TL3 may have an impedance of 50Ω and a length of λ/4 (or 90 degrees) of a center frequency. When low attenuation occurs, i.e., the first to fourth resistors R1 to R4 all have high resistances due to the 50Ω impedance, a sufficient return loss may be achieved. In addition, due to the λ/4 (or 90 degrees) length, and TL3, phase imbalance may be zero regardless of attenuation at the center frequency (e.g., 28 GHz).

In some embodiments, the first and second resistors R1 and R2 respectively connected to the first and second terminals A and B may each have a resistance that is higher than a resistance of the third and fourth resistors R3 and R4 respectively connected to the first and second nodes N1 and N2. For example, the third and fourth resistors R3 and R4 may have the same resistance, and the resistance of each of the first and second resistors R1 and R2 may be k times the resistance of each of the third and fourth resistors R3 and R4 (k>1). Accordingly, like the attenuator 30*a* of FIG. 3A, the attenuator 30*b* of FIG. 3B may also include nonuniform resistors, and have a sufficient return loss and a wide attenuation range. Hereinafter, embodiments will be described with reference to the attenuator 30*a* of FIG. 3A and examples modified therefrom, but it will be understood that they will be described with reference to the attenuator 30*b* of FIG. 3B and examples modified therefrom.

Figure 5A:
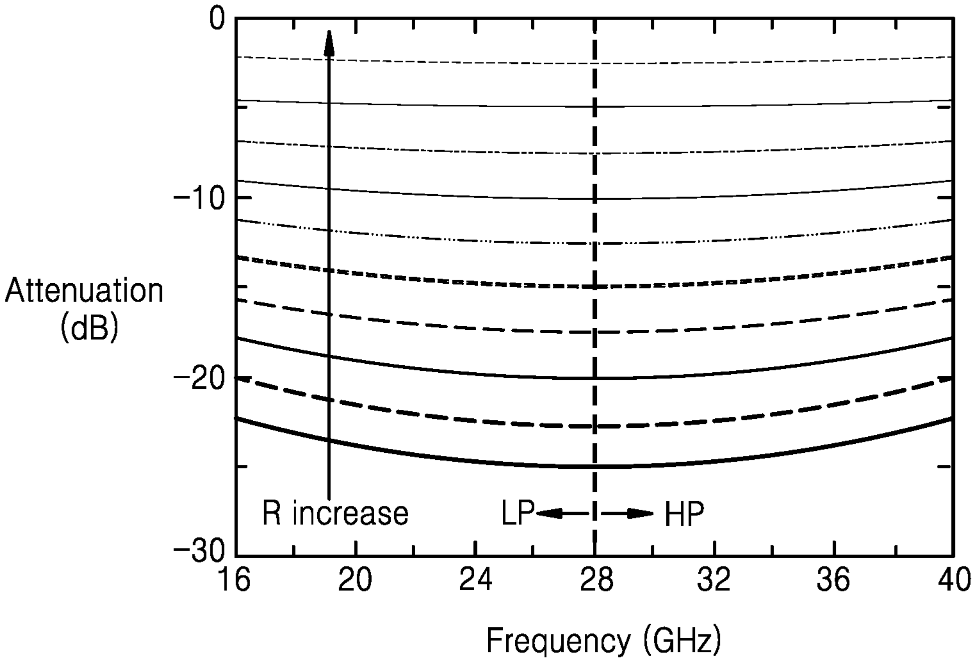
FIGS. 5A and 5B are graphs illustrating characteristics of attenuators, according to embodiments.
Figure 5B:
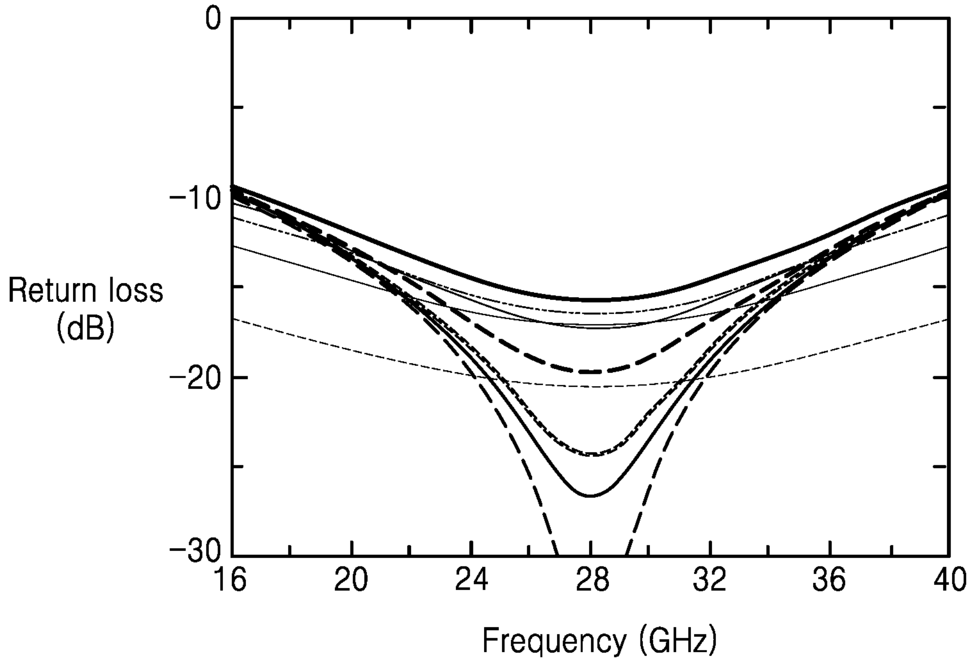

FIGS. 5A and 5B are graphs illustrating characteristics of attenuators, according to embodiments. In detail, the graph of FIG. 5A shows attenuation of the attenuator 30*a* of FIG. 3A, and the graph of FIG. 5B shows a return loss of the attenuator 30*a* of FIG. 3A. Hereinafter, the graphs of FIGS. 5A and 5B will be described with reference to FIG. 3A.

Referring to FIG. 5A, the attenuation of the attenuator 30*a* may be adjusted in steps of 2.5 dB from 25 dB. As shown in FIG. 5A, as a resistance R of the attenuator 30*a* increases, i.e., the resistances of the first to third resistors R1 to R3 increase, the amount of attenuation may decrease. Furthermore, as shown in FIG. 5A, an attenuation fluctuation in a frequency range of 20 GHz to 36 GHz may be less than 1.2 dB at each attenuation level.

Referring to FIG. 5B, the return loss of the attenuator 30*a* may be better than 11.9 dB at the same bandwidth. Furthermore, the attenuator 30*a* may provide an attenuation range of 25 dB while a return loss at a center frequency (i.e., 28 GHz) may be greater than 15 dB at all attenuation levels.

Figure 6A:
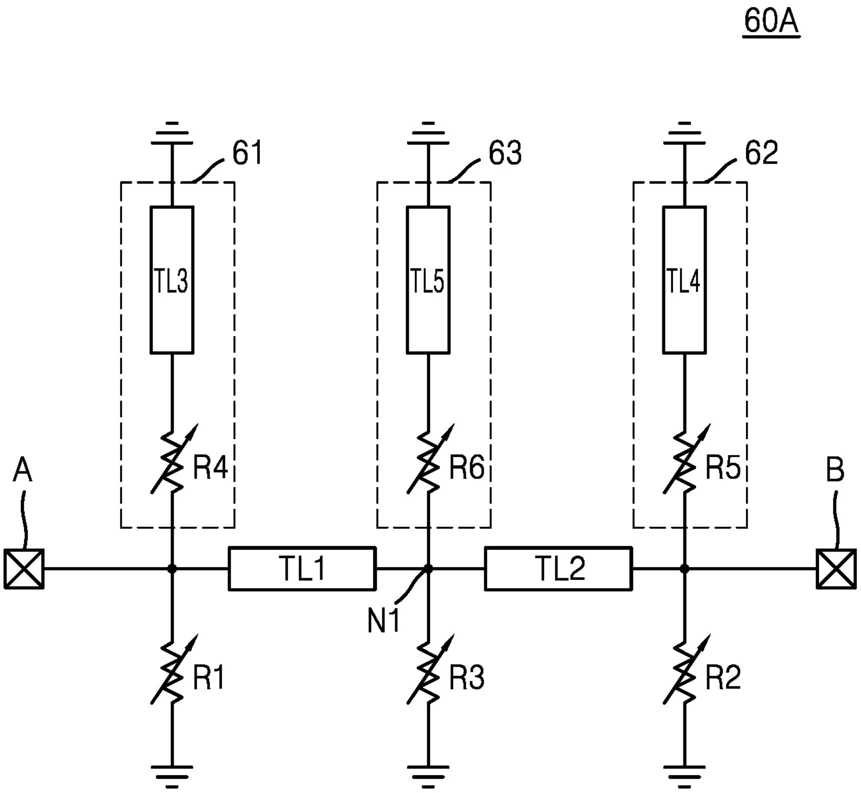
FIGS. 6A and 6B are circuit diagrams illustrating attenuators according to an embodiments.

FIG. 6A is a circuit diagram illustrating an attenuator 60A according to an embodiment. As shown in FIG. 6A, the attenuator 60A may have a symmetrical structure, and thus, have bidirectionality. For example, the attenuator 60A may attenuate a signal received via a first terminal A and output the received signal via a second terminal B in a transmission mode, and attenuate a signal received via the second terminal B and output the received signal via the first terminal A in a reception mode.

As shown in FIG. 6, the attenuator 60A may include first to third resistors R1 to R3 connected in parallel with one another via first and second transmission lines TL1 and TL2. The first resistor R1 may be connected between the first terminal A and a ground node, the second resistor R2 may be connected between the second terminal B and a ground node, and the third resistor R3 may be connected between a first node N1 and a ground node. Furthermore, the first transmission line TL1 may be connected between the first terminal A and the first node N1, and the second transmission line TL2 may be connected between the second terminal B and the first node N1.

In some embodiments, each of the first and second transmission lines TL1 and TL2 may have an impedance of 50Ω and a length of λ/4 (or 90 degrees) of a center frequency. When low attenuation occurs, i.e., the first to third resistors R1 to R3 all have high resistances due to the 50Ω impedance, a sufficient return loss may be achieved. In addition, due to the λ/4 (or 90 degrees) length, phase imbalance may be zero regardless of attenuation at the center frequency (e.g., 28 GHz).

In some embodiments, the first and second resistors R1 and R2 respectively connected to the first and second terminals A and B may each have a resistance that is higher than a resistance of the third resistor R3 connected to the first node N1. For example, the resistance of each of the first and second resistors R1 and R2 may be k times the resistance of the third resistor R3 (k>1). Accordingly, the attenuator 60A may include nonuniform resistors, and have a sufficient return loss and a wide attenuation range.

The attenuator 60A may further include first to third branches 61 to 63 in comparison to the attenuator 30*a* of FIG. 3A. The attenuator 30*a* of FIG. 3A may have a zero phase imbalance regardless of the attenuation at the center frequency (e.g., 28 GHz) due to the λ/4-length transmission lines. However, in the attenuator 30*a* of FIG. 3A, as an operating frequency deviates farther away from the center frequency, phase imbalance may increase proportionally with the amount of attenuation. This is because the attenuator 30*a* functions as a low-pass filter at frequencies below the center frequency as indicated by "LP" in FIG. 5A, while functioning as a high pass filter at frequencies above the center frequency as indicated by "HP" in FIG. 5A. Accordingly, to address the phase imbalance, an attenuator may be required to function as a band pass filter, and for this purpose, the attenuator 60A of FIG. 6A may include the first to third branches 61 to 63. Herein, the first to third branches 61 to 63 may be collectively referred to as a phase compensation circuit.

As shown in FIG. 6A, the first branch 61 may be connected between the first terminal A and a ground node, the second branch 62 may be connected between the second terminal B and a ground node, and the third branch 63 may be connected between the first node N1 and a ground node. The first to third branches 61 to 63 may respectively include third to fifth transmission lines TL3 to TL5. The third to fifth transmission lines TL3 to TL5 may each have a length of λ/4 (or 90 degrees) of a center frequency, and may be connected in parallel with one another as shown in FIG. 6A. Accordingly, the phase compensation circuit may operate similarly to an inductor at frequencies below the center frequency and to a capacitor at frequencies thereabove.

In some embodiments, similar to the first to third resistors R1 to R3, the third and fourth transmission lines TL3 and TL4 may each have an impedance that is higher than that of the fifth transmission line TL5. For example, a ratio (i.e., k) between the resistance of the first and second resistors R1 and R2 and the resistance of the third resistor R3 may be equal to a ratio between the impedance of the third and fourth transmission lines TL3 and TL4 and the impedance of the fifth transmission line TL5. In some embodiments, the impedance of the third and fourth transmission lines TL3 and TL4 may be 70Ω, and the impedance of the fifth transmission line TL5 may be 15Ω.

As shown in FIG. 6A, the first branch 61 may include a fourth resistor R4 connected to the first terminal A, the second branch 62 may include a fifth resistor R5 connected to the second terminal B, and the third branch 63 may include a sixth resistor R6 connected to the first node N1. When the operating frequency deviates from the center frequency, a signal applied to the first or second terminal A or B may leak out to the third to fifth transmission lines TL3 to TL5, and such leakage may introduce errors, for example, at a minimum attenuation. As shown in FIG. 6, the fourth to sixth resistors R4 to R6 may be inserted into the attenuator 60 to reduce leakage accordingly. As shown in FIG. 6, each of the first to sixth resistors R1 to R6 may be a variable resistor of which a resistance varies according to a control signal, and may, for example, be a varistor having a varying resistance depending on a control voltage applied thereto.

In some embodiments, similar to the first to third resistors R1 to R3, the fourth and fifth resistors R4 and R5 may each have a resistance that is higher than that of the sixth resistor R6. For example, a ratio (i.e., k) between the resistance of the first and second resistors R1 and R2 and the resistance of the third resistor R3 may be equal to a ratio between the resistance of the fourth and fifth resistors R4 and R5 and the resistance of the sixth resistor R6. In some embodiments, the first, second, fourth, and fifth resistors R1, R2, R4, and R5 may all have the same resistance, and the third and sixth resistors R3 and R6 may each have the same resistance.

Figure 6B:
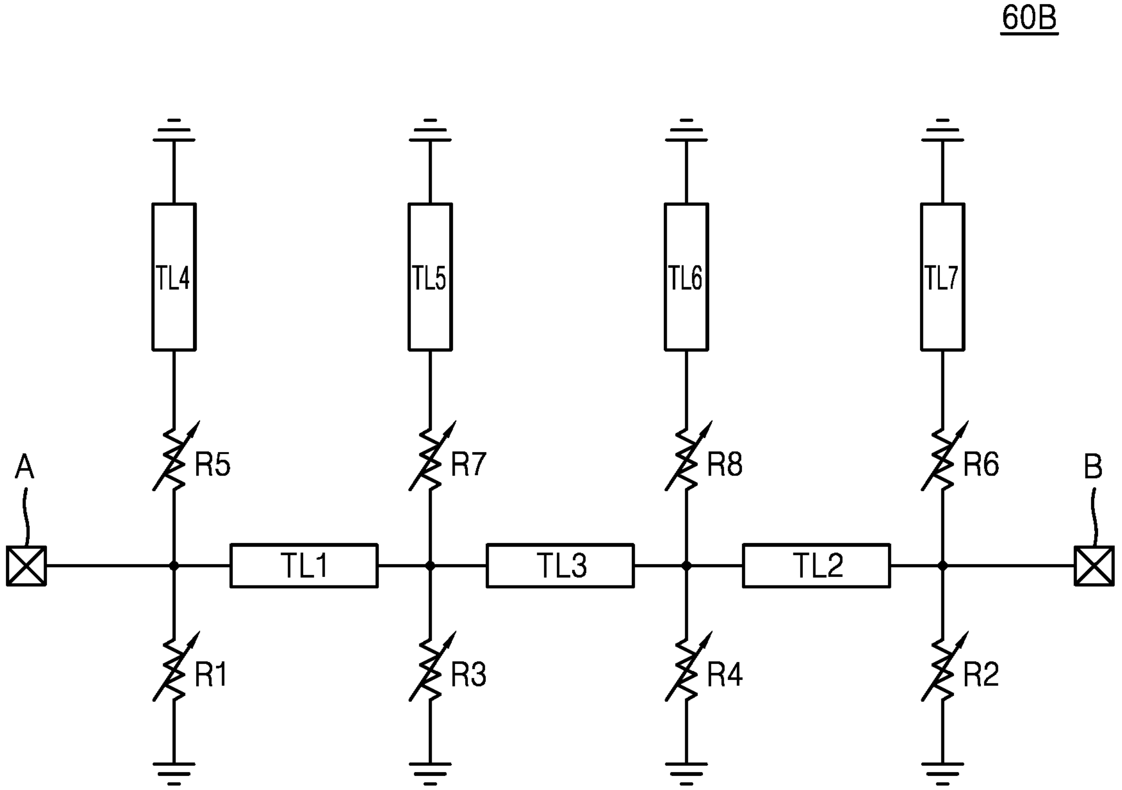

FIG. 6B is a circuit diagram illustrating an attenuator 60B according to an embodiment. As shown in FIG. 6B, the attenuator 60B may have a symmetrical structure, and thus, have bidirectionality. For example, the attenuator 60B may attenuate a signal received via a first terminal A and output the received signal via a second terminal B in a transmission mode, and attenuate a signal received via the second terminal B and output the received signal via the first terminal A in a reception mode.

Similar to the phase compensation circuit formed of the first to third branches 61 to 63 as shown in FIG. 6A, the attenuator 60B shown in FIG. 6B includes a phase compensation circuit formed of first to fourth branches 61 to 64 respectively having fifth to ninth resistors R5 to R9 and fourth to seventh transmission lines TL4 to TL7 in addition to those elements of the attenuator 30B shown in FIG. 3B to address phase imbalance that may occur therein. The first to fourth branches 61 to 64 may be respectively connected between the first terminal A and a ground node, between the second terminal B and a ground node, the first node N1 and a ground node, and the second node N2 and a ground node. The fourth to seventh transmission lines TL4 to TL7 may each have a length of λ/4 (or 90 degrees) of a center frequency, and may be connected in parallel with one another. Further, the fourth and fifth transmission lines TL4 and TL5 may each have an impedance that is higher than that of each of the sixth and seventh transmission lines TL6 and TL7. A ratio of the impedance of each of the fourth and fifth transmission lines TL4 and TL5 to the impedance of each of the sixth and seventh transmission lines TL6 and TL7 may be equal to a ratio of the resistance of each of the first and second resistors R1 and R2 to the resistance of each of the third and fourth resistors R3 and R4 shown in FIG. 3B.

Figure 7A:
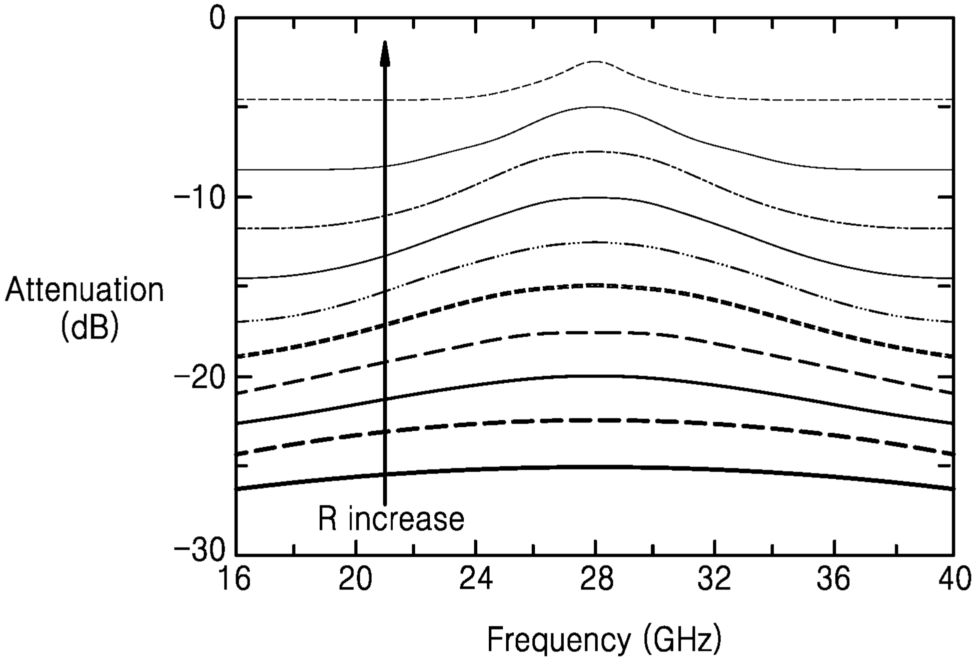
FIGS. 7A to 7C are graphs illustrating characteristics of an attenuator, according to an embodiment.
Figure 7B:
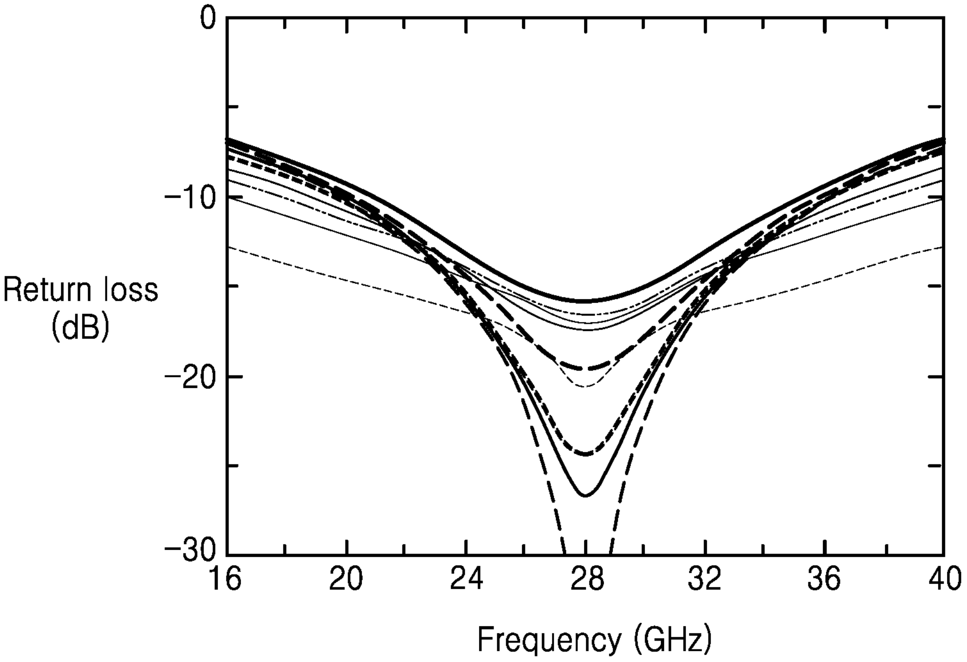
Figure 7C:
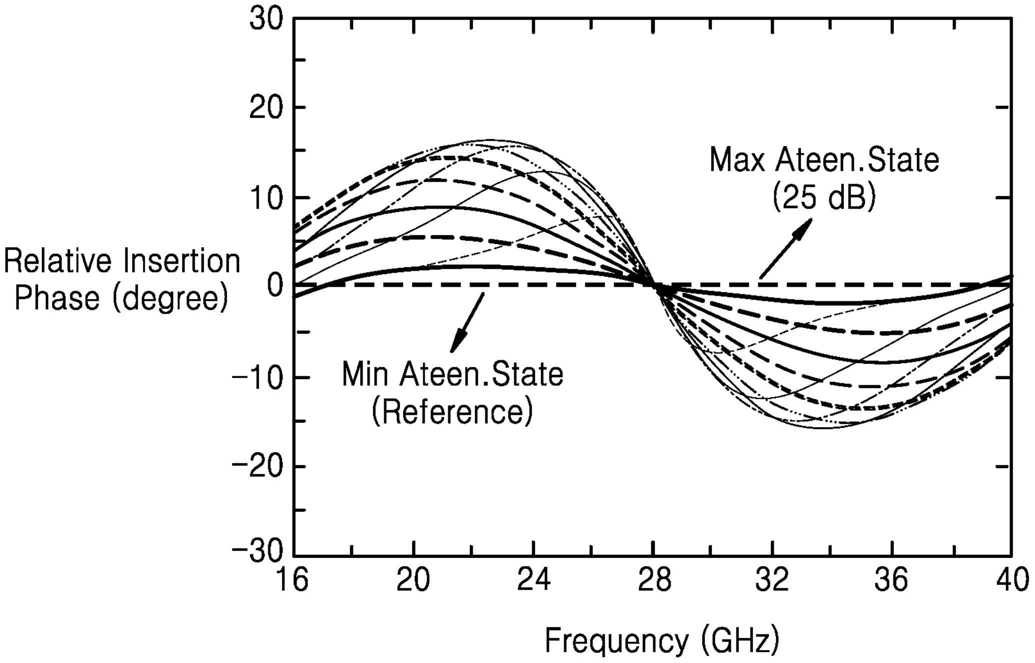

FIGS. 7A to 7C are graphs illustrating characteristics of attenuators, according to embodiments. In detail, the graph of FIG. 7A shows attenuation of the attenuator 60 of FIG. 6, the graph of FIG. 7B shows a return loss of the attenuator 60, and the graph of FIG. 7C shows a relative insertion phase of the attenuator 60. Hereinafter, descriptions with respect to FIGS. 7A to 7C will be provided with reference to FIG. 6.

Referring to FIG. 7A, as a resistance R of the attenuator 60 increases, i.e., the resistances of the first to sixth resistors R1 to R6 increase, the amount of attenuation may decrease. Referring to FIG. 7B, the return loss of the attenuator 60 may still be about 10 dB over an operating frequency range. Referring to FIG. 7C, the phase imbalance may increase as the operating frequency deviates farther away from the center frequency but then decrease again due to the phase compensation circuit, and thus, the attenuator 60 may exhibit an improved phase imbalance.

Figure 8:
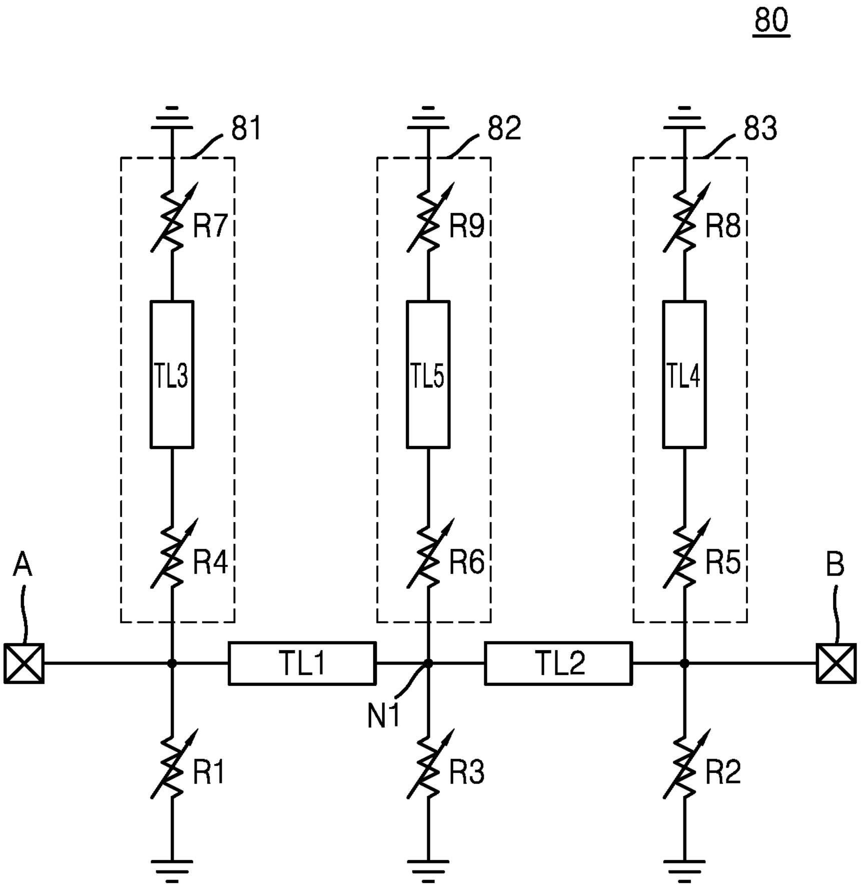
FIG. 8 is a circuit diagram illustrating an attenuator according to an embodiment.

FIG. 8 is a circuit diagram illustrating an attenuator 80 according to an embodiment. As shown in FIG. 8, the attenuator 80 may have a symmetrical structure, and thus, have bidirectionality. For example, the attenuator 80 may attenuate a signal received via a first terminal A and output the received signal via a second terminal B in a transmission mod, and attenuate a signal received via the second terminal B and output the received signal via the first terminal A in a reception mode.

As shown in FIG. 8, the attenuator 80 may include first to third resistors R1 to R3 connected in parallel with one another via first and second transmission lines TL1 and TL2. The first resistor R1 may be connected between the first terminal A and a ground node, the second resistor R2 may be connected between the second terminal B and a ground node, and the third resistor R3 may be connected between a first node N1 and a ground node. Furthermore, the first transmission line TL1 may be connected between the first terminal A and the first node N1, and the second transmission line TL2 may be connected between the second terminal B and the first node N1.

In some embodiments, each of the first and second transmission lines TL1 and TL2 may have impedance of 50Ω and a length of λ/4 (or 90 degrees) of a center frequency. When low attenuation occurs, i.e., the first to third resistors R1 to R3 all have high resistances, a sufficient return loss may be achieved due to the 50Ω impedance. In addition, due to the λ/4 (or 90 degrees) length, phase imbalance may be zero regardless of attenuation at the center frequency (e.g., 28 GHz).

In some embodiments, the first and second resistors R1 and R2 respectively connected to the first and second terminals A and B may each have a resistance that is higher than that of the third resistor R3 connected to the first node N1. For example, the resistance of each of the first and second resistors R1 and R2 may be k times the resistance of the third resistor R3 (k>1). Accordingly, the attenuator 80 may include nonuniform resistors, and have a sufficient return loss and a wide attenuation range.

Similar to the attenuator 60 of FIG. 6, the attenuator 80 may further include first to third branches 81 to 83. As described above with reference to FIG. 6, the first to third branches 81 to 83 may be added to the attenuator 80 to alleviate the phase imbalance. The first branch 81 may be connected between the first terminal A and a ground node, the second branch 62 may be connected between a second terminal B and a ground node, and the third branch 63 may be connected between the first node N1 and a ground node.

The first to third branches 61 to 63 may respectively include third to fifth transmission lines TL3 to TL5. The third to fifth transmission lines TL3 to TL5 may each have a length of λ/4 (or 90 degrees) of a center frequency, and may be connected in parallel with one another as shown in FIG. 8. In some embodiments, similar to the first to third resistors R1 to R3, the third and fourth transmission lines TL3 and TL4 may each have an impedance that is higher than that of the fifth transmission line TL5. For example, a ratio (i.e., k) between the resistance of the first and second resistors R1 and R2 and the resistance of the third resistor R3 may be equal to a ratio between the impedance of the third and fourth transmission lines TL3 and TL4 and the impedance of the fifth transmission line TL5. In some embodiments, the impedance of the third and fourth transmission lines TL3 and TL4 may be 70Ω, and the impedance of the fifth transmission line TL5 may be 15Ω.

As shown in FIG. 8, the first branch 81 may include a fourth resistor R4 connected to the first terminal A, the second branch 82 may include a fifth resistor R5 connected to the second terminal B, and the third branch 83 may include a sixth resistor R6 connected to the first node N1. As described above with reference to FIG. 6, leakage may be reduced due to the fourth to sixth resistors R4 to R6.

The attenuator 80 may further include seventh to ninth resistors R7 to R9 in comparison to the attenuator 60 of FIG. 6. Referring to the graph of FIG. 7A showing the characteristics of the attenuator 60 of FIG. 6, the attenuator 60 of FIG. 6 may have high-pass characteristics at a specific attenuation level below the center frequency, and an attenuation fluctuation may increase as the operating frequency increases. In order to address overcompensation at such a specific attenuation level, the first to third branches 81 to 83 may respectively include the seventh to ninth resistors R7 to R9.

In the first branch 81, when resistances of the fourth and seventh resistors R4 and R7 are $R_a$ and $R_b$, respectively, and the impedance of the third transmission line TL3 is $Z_c$, an input impedance $Z_{in}$ of the first branch 81 at the first terminal A may be calculated by using [Equation 1] below:

$$Z_{in} = R_a + Z_c\frac{R_b + jZ_c\tan\theta}{Z_c + jR_b\tan\theta} = \left(R_a + \frac{Z_C^2R_b(1+\tan^2\theta)}{Z_C^2 + R_b^2\tan^2\theta}\right) + j\frac{\tan\theta Z_c(Z_C^2 - R_b^2)}{Z_C^2 + R_b^2\tan^2\theta} \quad \text{[Equation 1]}$$

According to [Equation 1], a value of reactance may be adjusted by the resistance $R_b$ of the seventh resistor R7. Accordingly, inductance may decrease at frequencies below the center frequency while capacitance may decrease at frequencies above the center frequency, and consequently overcompensation may be addressed, and phase imbalance at each frequency and each attenuation may be improved.

In some embodiments, similar to the first to third resistors R1 to R3, the seventh and eighth resistors R7 and R8 may each have a resistance that is higher than that of the ninth resistor R9. For example, a ratio (i.e., k) between the resistance of the first and second resistors R1 and R2 and the resistance of the third resistor R3 may be equal to a ratio between the resistance of the seventh and eighth resistors R7 and R8 and the resistance of the ninth resistor R9. As shown in FIG. 8, each of the first to ninth resistors R1 to R9 may be a variable resistor of which a resistance varies according to a control signal, and may, for example, be a varistor having a varying resistance depending on a control voltage applied thereto.

In some embodiments, the seventh and eighth resistors R7 and R8 may each have a resistance that is lower than that of the first (or fourth) resistor R1 (or R4) and the second (or fifth) resistor R2 (or R5), and the ninth resistor R9 may have a resistance that is lower than that of the third (or sixth) resistor R3 (or R6). For example, at a maximum attenuation, the seventh to ninth resistors R7 to R9 may have a small resistance to prevent undercompensation. For example, the seventh and eighth resistors R7 and R8 may each have a resistance that is one-fifth of the resistance of the first and second resistors R1 and R2, and the ninth resistor R9 may have a resistance that is one-fifth of the resistance of the third resistor R3.

Figure 9A:
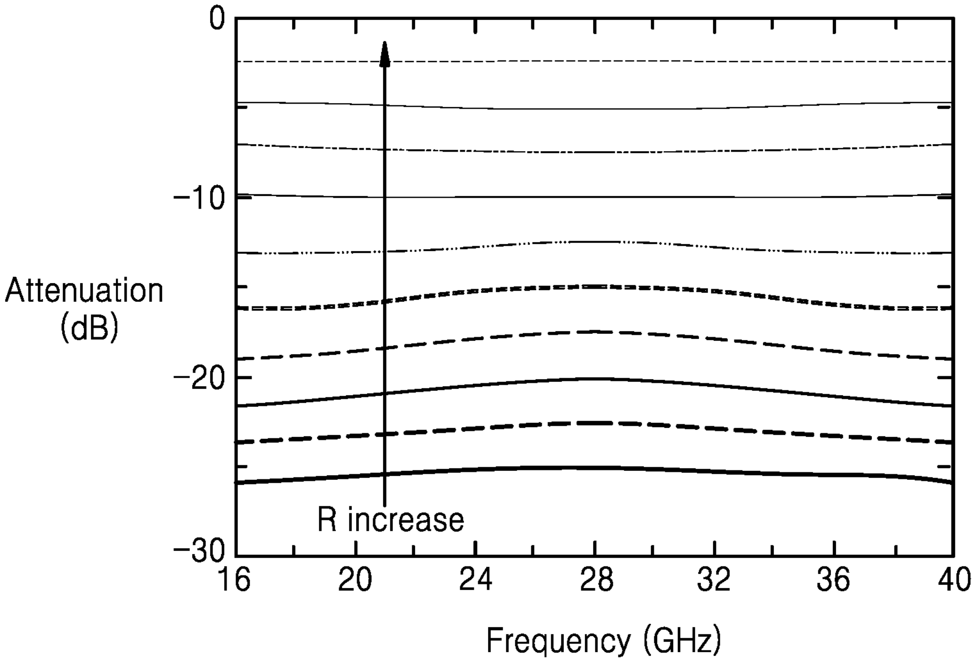
FIGS. 9A to 9C are graphs illustrating characteristics of an attenuator, according to an embodiment.
Figure 9B:
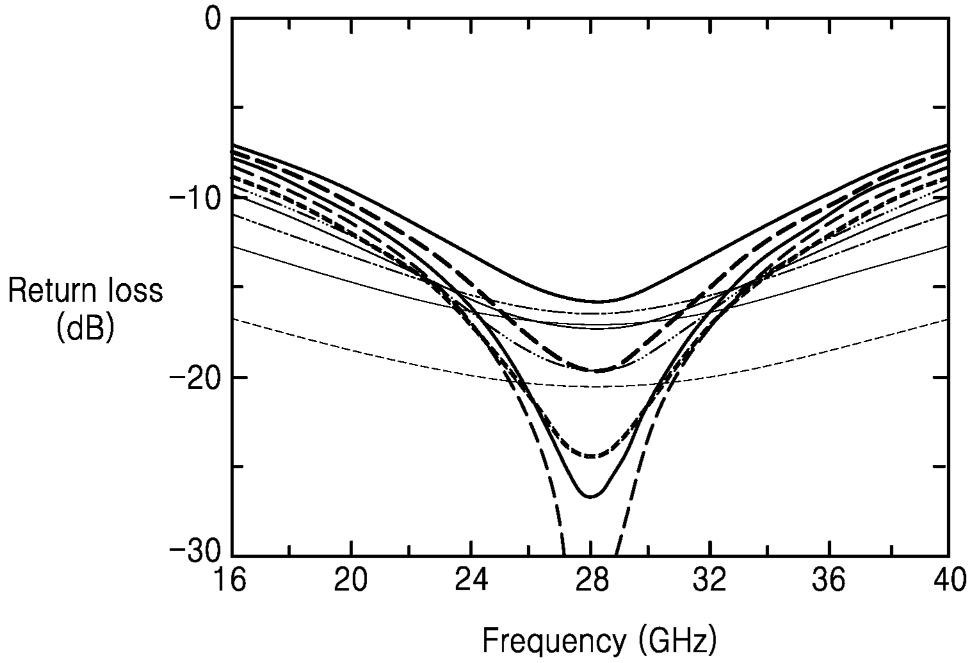
Figure 9C:
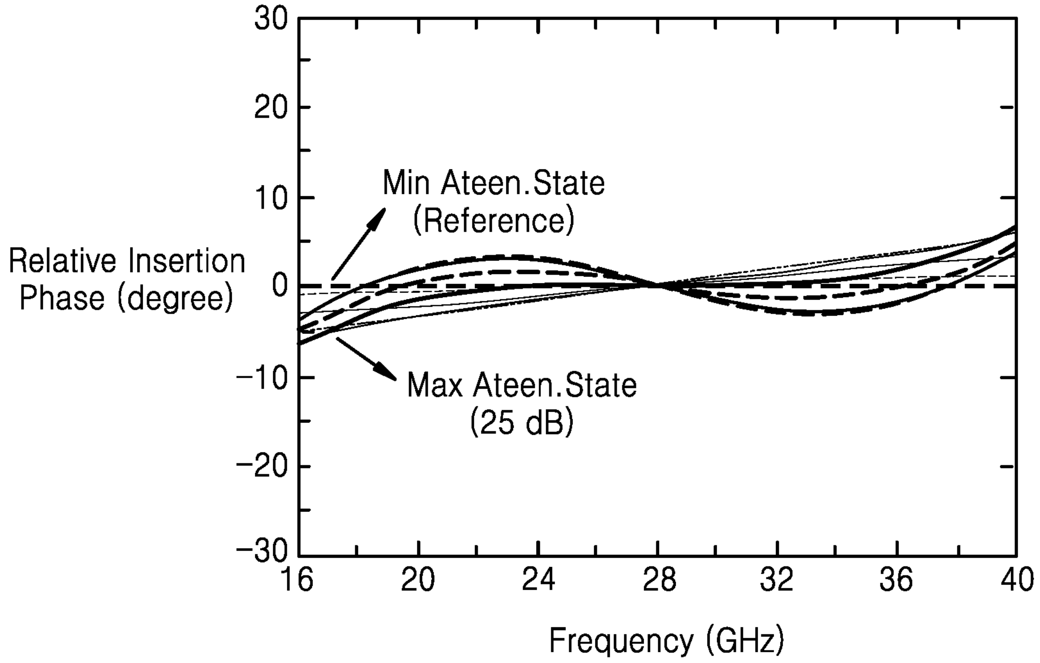

FIGS. 9A to 9C are graphs illustrating characteristics of the attenuator 80, according to an embodiment. In detail, the graphs of FIG. 9A to 9C respectively show attenuation, return loss, and relative insertion phase of the attenuator 80 of FIG. 8. Hereinafter, descriptions with respect to FIGS. 9A to 9C will be provided with reference to FIG. 8.

Referring to FIG. 9A, as a resistance R of the attenuator 80 increases, i.e., the resistances of the first to ninth resistors R1 to R9 increase, the amount of attenuation may decrease. As shown in FIG. 9A, attenuation fluctuations at all attenuation levels may be approximately within 1 dB. Referring to FIG. 9B, the return loss of the attenuator 80 may still be better than 9.7 dB over an operating frequency range. Referring to FIG. 9C, phase imbalance may be less than 5.4 degrees in a range of 20 GHz to 36 GHz, and may be further improved when compared with the graph of FIG. 7C.

Figure 10A:
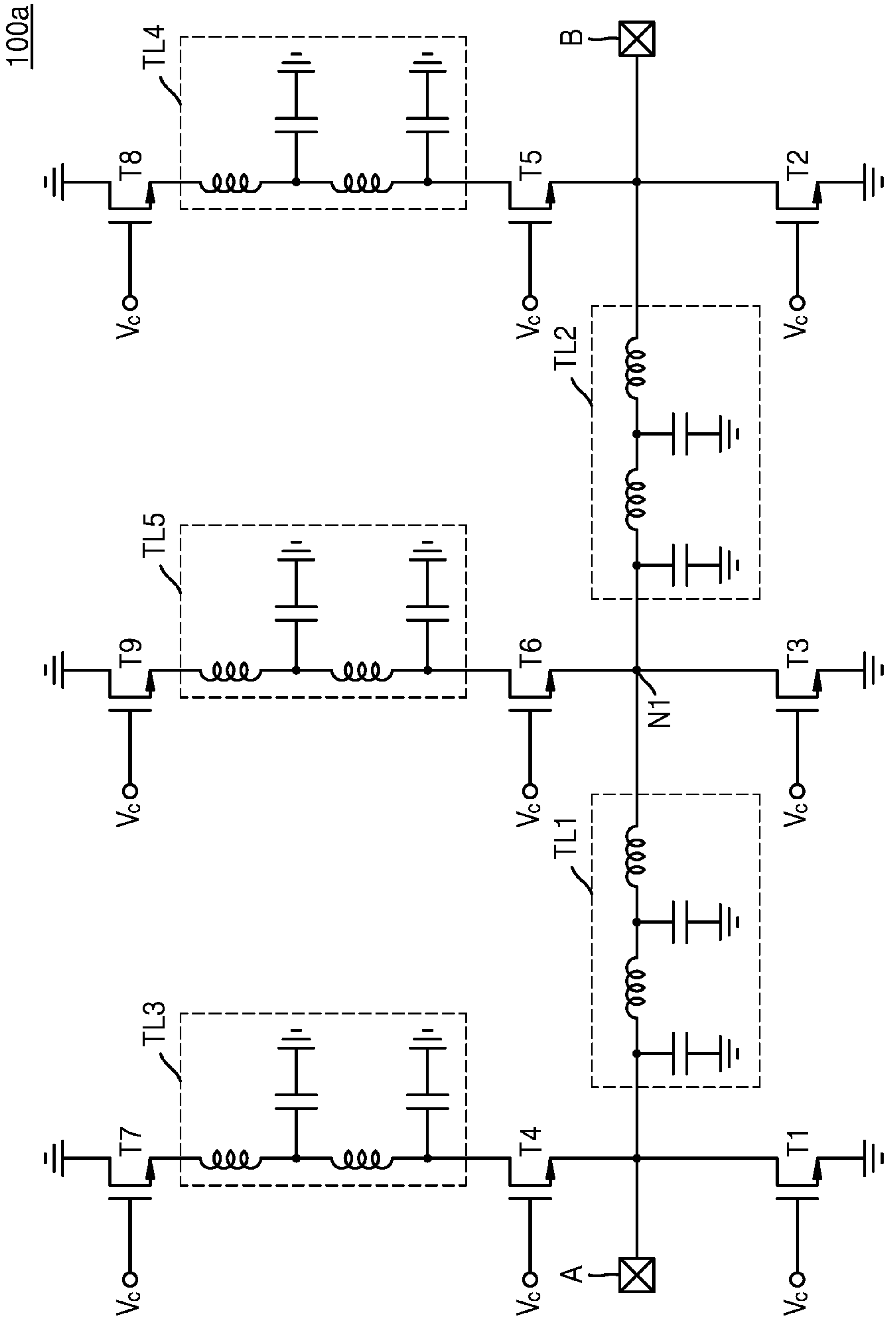
FIGS. 10A and 10B are circuit diagrams illustrating attenuators according to embodiments.
Figure 10B:
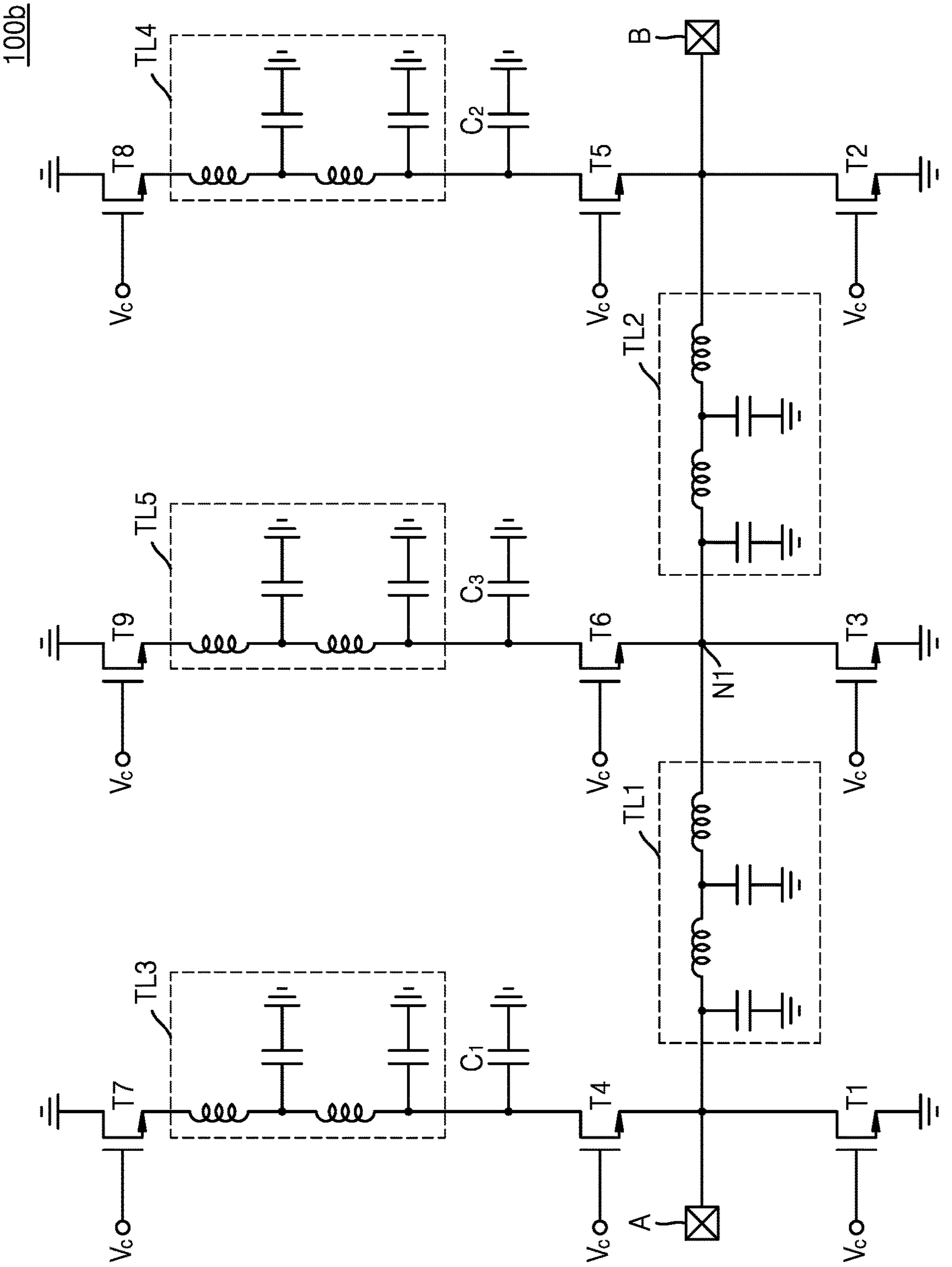

FIGS. 10A and 10B are circuit diagrams illustrating examples of attenuators 100*a* and 100*b* according to embodiments. In detail, the circuit diagrams of FIGS. 10A and 10B show equivalent circuits corresponding to the attenuator 80 of FIG. 8. As shown in FIGS. 10A and 10B, the attenuators 100*a* and 100*b* may be manufactured using a complementary metal-oxide-semiconductor (CMOS) process. Hereinafter, descriptions with respect to FIGS. 10A and 10B will be provided with reference to FIG. 8, and redundant descriptions with respect to FIGS. 10A and 10B will be omitted.

Referring to FIG. 10A, the attenuator 100*a* may include first to ninth transistors T1 to T9 respectively corresponding to the first to ninth resistors R1 to R9 of FIG. 8. Each of the first to ninth transistors T1 to T9 may function as a varistor providing a resistance that varies according to a gate voltage applied. In some embodiments, the first to ninth transistors T1 to T9 may have channel widths corresponding to resistances. For example, each of the first and second transistors T1 and T2 that provides a resistance that is k times a resistance of the third transistor T3 may have a channel width that is 1/k times a channel width of the third transistor T3. Similarly, the fourth and fifth transistors T4 and T5 may each have a channel width that is 1/k times a channel width of the sixth transistor T6, and the seventh and eighth transistors T7 and T8 may each have a channel width that is 1/k times a channel width of the ninth transistor T9. Accordingly, the first to ninth transistors T1 to T9 may commonly receive a control voltage $V_c$ adjusted according to the amount of attenuation, and simple control of the attenuator 100*a* may be achieved. For example, each of the first to ninth transistors T1 to T9 may be an n-channel MOS (NMOS), and provide a resistance that decreases as the control voltage $V_c$ increases. An example of a transistor used as a varistor will be described below with reference to FIGS. 11A and 11B.

In some embodiments, when k is 5, the first, second, fourth, and fifth transistors T1, T2, T4, and T5 may each have a channel width of 21 μm, and the third and sixth transistors T3 and T6 may each have a channel width of 105 μm. In addition, the seventh and eighth transistors T7 and T8 may each have a channel width of 105 μm, and the ninth transistor T9 may have a channel width of 525 μm. In some embodiments, the channel width of the ninth transistor T9 may be limited to a maximum permissible channel width for the process (e.g., 500 μm). A ratio between resistances included in the attenuator 100*a* may be defined based on a channel width of corresponding transistors and remain constant despite PVT variations, and thus, the attenuator 100*a* may have a high reliability.

As shown in FIG. 10A, the attenuator 100*a* may include first to fifth transmission lines TL1 to TL5 respectively corresponding to the first to fifth transmission lines TL1 to TL5 of FIG. 8. For wideband operation, a transmission line may include two λ/8 (or 45 degree) transmission line sections instead of one λ/4 LP H network. Inductance $L_X$ and capacitance $C_X$ of the transmission line may be calculated by using [Equation 2] below:

$$L_X = \frac{Z_X \sin(\theta)}{w_0},\ C_X = \frac{\tan(\theta/2)}{w_0 Z_X}, \quad \text{[Equation 2]}$$

where θ may be λ/4, and $Z_X$ may be a characteristic impedance of the transmission line.

Referring to FIG. 10B, the attenuator 100*b* may include first to ninth transistors T1 to T9 and first to fifth transmission lines TL1 to TL5. In addition, the attenuator 100*b* may further include first to third capacitors $C_1$ to $C_3$ in comparison to the attenuator 100*a* of FIG. 10A. For example, in the attenuator 100*a* of FIG. 10A, due to parasitic capacitances of the fourth to sixth transistors T4 to T6, parasitic capacitances in a first terminal A, a second terminal B, and a first node N1 may change due to attenuation fluctuations, and accordingly, phase imbalance may increases according to the attenuation level. For example, at a low attenuation level, because the fourth to sixth transistors T4 to T6 may have high on-resistances, effects of the parasitic capacitances of the fourth to sixth transistors T4 to T6 may increase, and the first and second transmission lines TL1 and TL2 may be prevented from functioning as a 50Ω λ/4 transmission line, and thus, phase imbalance may increase.

To prevent increase in the phase imbalance according to an attenuation level, shunt capacitors, i.e., the first to third capacitors $C_1$ to $C_3$ may be inserted into the attenuator 100*b*. As shown in FIG. 10B, the first capacitor $C_1$ may be connected to the fourth transistor T4 and the third transmission line TL3, the second capacitor $C_2$ may be connected to the fifth transistor T5 and the fourth transmission line TL4, and the third capacitor $C_3$ may be connected to the sixth transistor T6 and the fifth transmission line TL5. In some embodiments, the first and second capacitors $C_1$ and $C_2$ may each have a capacitance (e.g., 17 femtofarad (fF)) that is lower than a capacitance (e.g., 100 fF) of the third capacitor $C_3$.

Figure 11A:
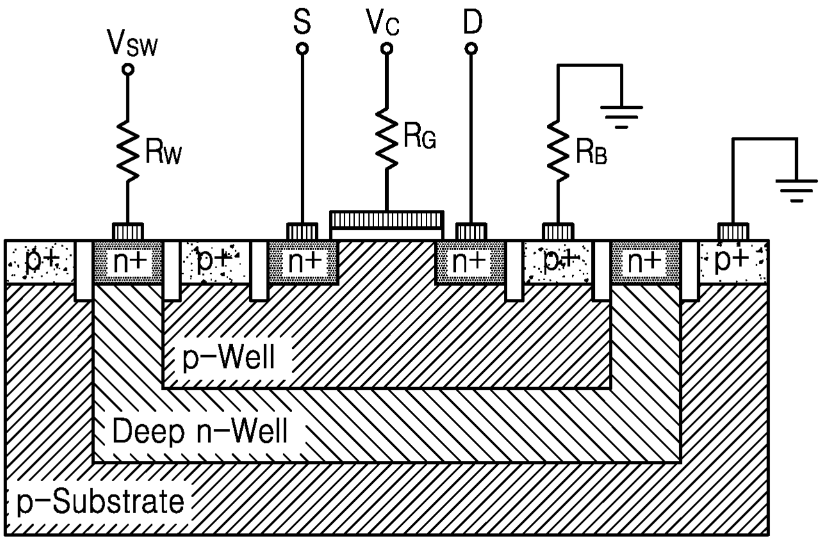
FIGS. 11A and 11B are diagrams illustrating a transistor according to embodiments.
Figure 11B:
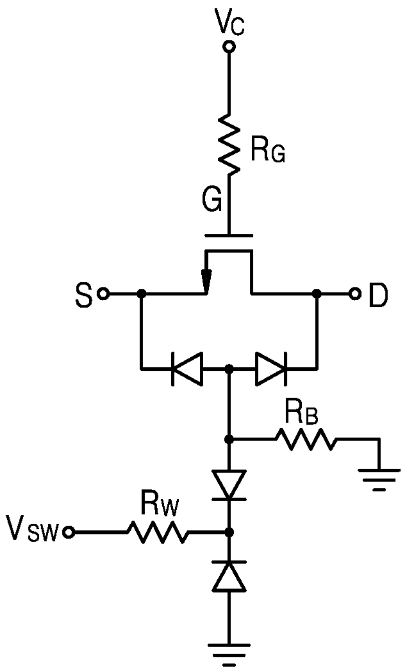

FIGS. 11A and 11B are diagrams illustrating examples of a transistor according to embodiments. In detail, FIG. 11A shows a cross-section of the transistor taken in a stacking direction, and FIG. 11B is a circuit diagram showing an equivalent circuit of the transistor.

Referring to FIGS. 11A and 11B, an attenuator may include a triple well transistor as a varistor. For example, as shown in FIG. 11A, a deep n-well may be formed in the p-substrate, a p-well may then be formed on the deep n-wall, and a transistor may be formed in the p-well. The transistor of FIG. 11A may be modeled as in FIG. 11B.

In some embodiments, the transistor may include thick gate oxide to handle high power levels. A gate G and a body of the transistor are allowed to float so as to prevent signal leakage and/or gate oxide breakdown. For example, as shown in FIGS. 11A and 11B, resistors $R_G$, $R_W$, and $R_B$ may be respectively connected to the gate G of the transistor, the deep n-well, and the p-well.

Figure 12:
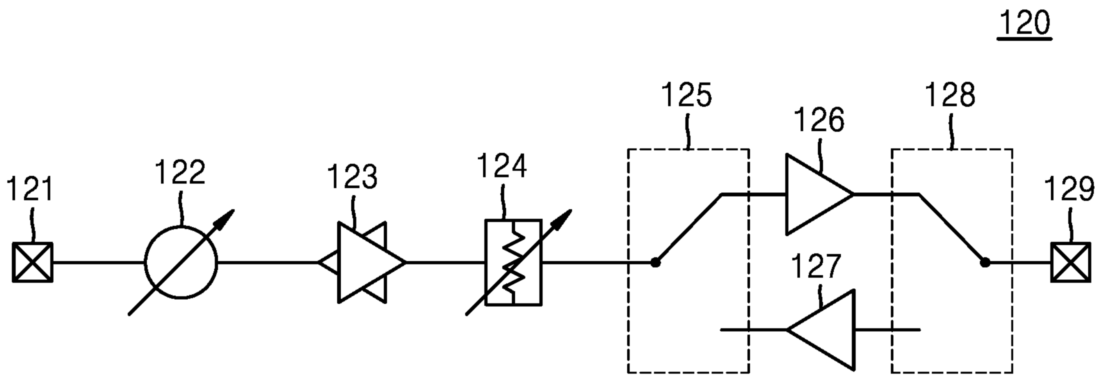
FIG. 12 is a block diagram of a channel according to an embodiment.

FIG. 12 is a block diagram of a channel 120 according to an embodiment. As described above with reference to FIG. 1, the channel 120 may be connected to one antenna included in an antenna array via a second terminal 129, and provide, to the antenna, a signal provided by a processing circuitry (e.g., 11 of FIG. 1) via a first terminal 121 or deliver a signal received via the antenna to the processing circuitry. Hereinafter, descriptions with respect to FIG. 12 will be provided with reference to FIG. 1.

Referring to FIG. 12, the channel 120 may include a phase shifter 122, an amplifier 123, an attenuator 124, a first switch 125, a power amplifier (PA) 126, a low noise amplifier (LNA) 127, and a second switch 128. In some embodiments, the phase shifter 122, the amplifier 123, and the attenuator 124 may be arranged in a different order than shown in FIG. 12. Furthermore, in some embodiments, the channel 120 may further include a component not shown in FIG. 12, such as a mixer. In some embodiments, the phase shifter 122, the amplifier 123, the attenuator 124, the first switch 125, the PA 126, the LNA 127, and the second switch 128 may be manufactured by using a semiconductor manufacturing process. In some embodiments, the phase shifter 122, the amplifier 123, the attenuator 124, the first switch 125, the PA 126, the LNA 127, and the second switch 128 may be incorporated into a single semiconductor package. In some embodiments, at least two of the phase shifter 122, the amplifier 123, the attenuator 124, the first switch 125, the PA 126, the LNA 127, and the second switch 128 may be incorporated into different semiconductor packages.

The phase shifter 122 may shift a phase of a signal. As described above with reference to FIG. 1, a phase of a signal output via an antenna may be adjusted to form a beam, and the phase shifter 122 may shift the phase of the signal according to control by the processing circuitry 11. The amplifier 123 may amplify an output of the phase shifter 122 and provide it to the attenuator 124, or may amplify a signal provided from the attenuator 124 and provide the resulting signal to the phase shifter 122.

The attenuator 124 may then attenuate the signal output from the amplifier 123 and provide the attenuated signal to the first switch 125, or provide the signal provided from the first switch 125 to the amplifier 123. As described above with reference to the figures, the attenuator 124 may include nonuniform resistors, and thus, provide a wide attenuation range, a low insertion loss, and a high return loss. In some embodiments, the attenuator 124 may include a phase compensation circuit, and thus, exhibit low phase imbalance over a wide frequency range. As a result, the attenuator 124 may have a reduced effect on the amplifier 123 and/or the first switch 125 and efficiently attenuate a signal provided from the amplifier 123 or the first switch 125 over a wide frequency range.

The first switch 125 may operate according to a transmission mode or a reception mode. For example, as shown in FIG. 12, the first switch 125 may connect the attenuator 124 to the PA 126 in the transmission mode, while connecting the attenuator 124 to the LNA 127 in the reception mode. In addition, the second switch 128 may also operate according to the transmission mode or reception mode. For example, as shown in FIG. 12, the second switch 128 may connect, in the transmission mode, the PA 126 to the second terminal 129 to which the antenna is connected, while connecting the LNA 127 to the second terminal 129 in the reception mode.

The PA 126 may receive a signal provided by the attenuator 124 in the transmission mode via the first switch 125, and then, amplify the received signal. For example, the PA 126 may amplify the signal provided by the attenuator 124 so that a signal output via the antenna has an appropriate transmit power.

The LNA 127 may receive a signal from the antenna via the second terminal 129 in the reception mode, and then, amplify the received signal. For example, the low noise amplifier 127 may amplify a low power signal received via the second terminal 129 without degrading a signal-to-noise ratio (SNR).

While the inventive concept has been particularly shown and described with reference to example embodiments thereof, it will be understood that various changes in form and details may be made therein without departing from the spirit and scope of the following claims.

What is claimed is:

1. An attenuator comprising:

a first transmission line connected between a first terminal and a first node;

a second transmission line connected between a second terminal and a second node;

a third transmission line connected between the first node and the second node;

a first resistor connected between the first terminal and a ground node;

a second resistor connected between the second terminal and the ground node;

a third resistor connected between the first node and the ground node; and a fourth resistor connected between the second node and the ground node, wherein the first and second resistors each have a resistance that is higher than a resistance that the third and fourth resistors each have, and wherein each of the first to fourth resistors is a varistor.

2. The attenuator of claim 1, further comprising:

a first branch connected between the first terminal and the ground node;

a second branch connected between the second terminal and the ground node;

a third branch connected between the first node and the ground node; and a fourth branch connected between the second node and the ground node, wherein the first to fourth branches respectively comprise fourth to seventh transmission lines, wherein the fourth and fifth transmission lines each have an impedance that is higher than an impedance that the sixth and seventh transmission lines each have, and wherein a ratio of the impedance of the fourth or fifth transmission line to the impedance of the sixth or seventh transmission line is equal to a ratio of the resistance of the first or second resistor to the resistance of the third or fourth resistor.

3. An attenuator comprising:

a first transmission line connected between a first terminal and a first node;

a second transmission line connected between the first node and a second terminal;

a first resistor connected between the first terminal and a ground node;

a second resistor connected between the second terminal and the ground node; and a third resistor connected between the first node and the ground node, wherein the first and second resistors each have a resistance that is higher than a resistance of the third resistor, and wherein each of the first to third resistors is a varistor.

4. The attenuator of claim 3, wherein the first and second transmission lines each have a same impedance and each have a length of one-quarter wavelength of a center frequency.

5. The attenuator of claim 3, further comprising:

a first branch connected between the first terminal and the ground node;

a second branch connected between the second terminal and the ground node; and a third branch connected between the first node and the ground node, wherein the first to third branches respectively comprise third to fifth transmission lines, and wherein the third and fourth transmission lines each have an impedance that is higher than an impedance of the fifth transmission line.

6. The attenuator of claim 5, wherein a ratio of the impedance of the third or fourth transmission line to the impedance of the fifth transmission line is equal to a ratio of the resistance of the first or second resistor to the resistance of the third resistor.

7. The attenuator of claim 5, wherein the impedance of the third or fourth transmission line is higher than an impedance of each of the first and second transmission lines, and wherein the impedance of the fifth transmission line is lower than the impedance of each of the first and second transmission lines.

8. The attenuator of claim 5, wherein each of the third to fifth transmission lines has a length of one-quarter wavelength of a center frequency.

9. The attenuator of claim 5, wherein the first branch further includes a fourth resistor connected between the first terminal and the third transmission line, wherein the second branch further includes a fifth resistor connected between the second terminal and the fourth transmission line, wherein the third branch further includes a sixth resistor connected between the first node and the fifth transmission line, and wherein the fourth and fifth resistors each have a resistance that is higher than a resistance of the sixth resistor.

10. The attenuator of claim 9, wherein a ratio of the resistance of the fourth or fifth resistor to the resistance of the sixth resistor is equal to a ratio of the resistance of the first or second resistor to the resistance of the third resistor.

11. The attenuator of claim 10, wherein the resistance of the fourth or fifth resistor is equal to the resistance of the first or second resistor, and wherein the resistance of the sixth resistor is equal to the resistance of the third resistor.

12. The attenuator of claim 5, wherein the first branch further includes a seventh resistor connected between the third transmission line and the ground node, wherein the second branch further includes an eighth resistor connected between the fourth transmission line and the ground node, wherein the third branch further includes a ninth resistor connected between the fifth transmission line and the ground node, and wherein the seventh and eighth resistors each have a fifth resistance that is higher than a sixth resistance of the ninth resistor.

13. The attenuator of claim 12, wherein a ratio of the resistance of the seventh or eighth resistor to the resistance of the ninth resistor is equal to a ratio of the resistance of the first or second resistor to the resistance of the third resistor.

14. An apparatus comprising:

a plurality of antennas respectively corresponding to a plurality of channels;

a plurality of phase shifters respectively corresponding to the plurality of channels; and a plurality of attenuators respectively corresponding to the plurality of channels, wherein each of the plurality of attenuators comprises:

a first resistor connected between a first terminal and a ground node;

a second resistor connected between a second terminal and the ground node; and at least one third resistor connected in parallel with the first and second resistors via a transmission line, and wherein the first and second resistors each have a resistance that is higher than a resistance of the at least one third resistor, and wherein each of the first to third resistors is a varistor.

15. The apparatus of claim 14, wherein each of the plurality of attenuators comprises:

a first branch connected between the first terminal and the ground node;

a second branch connected between the second terminal and the ground node; and at least one third branch connected in parallel with the first and second branches, wherein the first and second branches respectively comprise first and second transmission lines, and the at least one third branch comprises at least one third transmission line, and wherein the first and second transmission lines each have an impedance that is higher than an impedance of the at least one third transmission line.

16. The apparatus of claim 15, wherein a ratio of the impedance of the first or second transmission line to the impedance of the at least one third transmission line is equal to a ratio of the resistance of the first or second resistor to the resistance of each of the at least one third resistor.

17. The apparatus of claim 14, wherein the transmission line has a length of one-quarter wavelength of a center frequency.

* * * * *